US011550065B2

(12) United States Patent
Wang et al.

(10) Patent No.: US 11,550,065 B2
(45) Date of Patent: Jan. 10, 2023

(54) GLOBAL NAVIGATION SATELLITE SYSTEM PRECISE POSITIONING ENGINE WITH ESTIMATED IONOSPHERE

(71) Applicant: QUALCOMM Incorporated, San Diego, CA (US)

(72) Inventors: Min Wang, Tustin, CA (US); Gengsheng Zhang, Cupertino, CA (US); Ning Luo, Cupertino, CA (US); Yuxiang Peng, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 17/106,772

(22) Filed: Nov. 30, 2020

(65) Prior Publication Data

US 2022/0171076 A1    Jun. 2, 2022

(51) Int. Cl.
*G01S 19/40* (2010.01)
*G01S 19/44* (2010.01)

(52) U.S. Cl.
CPC ............ *G01S 19/40* (2013.01); *G01S 19/44* (2013.01)

(58) Field of Classification Search
CPC ........... G01S 19/40; G01S 19/44; G01S 19/43
USPC .................................................... 342/357.23
See application file for complete search history.

(56) References Cited

U.S. PATENT DOCUMENTS

| 9,923,626 | B2 | 3/2018 | Loomis et al. |
| 10,288,743 | B2 | 5/2019 | Rapoport |
| 2018/0210091 | A1 | 7/2018 | Di Federico et al. |
| 2020/0158885 | A1 | 5/2020 | Chen |

FOREIGN PATENT DOCUMENTS

| CN | 107356947 B | * | 6/2019 | ............. G01S 19/37 |
| CN | 111638535 A | * | 9/2020 | ............. G01S 19/04 |
| CN | 109951796 B | * | 10/2020 | |
| EP | 4009081 A1 | * | 6/2022 | |

OTHER PUBLICATIONS

International Search Report and Written Opinion—PCT/US2021/052308—ISA/EPO—dated Jan. 19, 2022.

* cited by examiner

*Primary Examiner* — Harry K Liu
(74) *Attorney, Agent, or Firm* — Thien T. Nguyen

(57) ABSTRACT

Disclosed are various techniques for wireless communication. In one aspect, a user equipment (UE) may receive, from a satellite vehicle (SV), a signal of a first frequency band, estimate a first ionospheric delay residual error based on the signal of the first frequency band, calculate a first pseudorange measurement and a first carrier phase measurement based on the first ionospheric delay residual error, and estimate a position using the first pseudorange measurement and the first carrier phase measurement. In some aspects, the ionospheric delay residual error is estimated via a Klobuchar equation. In some aspects, the position is estimated using ultra-long baseline real-time kinematics (RTK) positioning.

31 Claims, 12 Drawing Sheets

GLOBAL NAVIGATION SATELLITE SYSTEM PRECISE POSITIONING ENGINE WITH ESTIMATED IONOSPHERE

BACKGROUND OF THE DISCLOSURE

1. Field of the Disclosure

Aspects of the disclosure relate generally to global navigation satellite system (GNSS) precise positioning engines (PPEs).

2. Description of the Related Art

The global navigation satellite system (GNSS) is widely used for location and location applications. Accuracy is important for many of those applications, but there are delays in the ionosphere and troposphere that negatively affect the ability to reliably measure accurate GNSS location/pseudorange values.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

A new precise point positioning (PPP) model that does not require dual frequency measurements to estimate the ionospheric delay and is thus applicable in situations where signals in the L1 or L5 frequency are not available, and systems that use the new PPP model, are presented herein. Moreover, in situations where L1 and L5 are both available, the new PPP model provides better performance over conventional methods.

In some implementations, a method for precise point positioning (PPP) includes, at a user equipment (UE): receiving, from a satellite vehicle (SV), a signal of a first frequency band; estimating a first ionospheric delay residual error based on the signal of the first frequency band; calculating a first pseudorange measurement and a first carrier phase measurement based on the first ionospheric delay residual error; and estimating a position using the first pseudorange measurement and the first carrier phase measurement.

In some implementations, a UE includes a memory, at least one transceiver, and at least one processor communicatively coupled to the memory and the at least one transceiver, the at least one processor configured to: receive, from a SV, a signal of a first frequency band; estimate a first ionospheric delay residual error based on the signal of the first frequency band; calculate a first pseudorange measurement and a first carrier phase measurement based on the first ionospheric delay residual error; and estimate a position using the first pseudorange measurement and the first carrier phase measurement.

In some implementations, a UE includes: means for receiving, from a SV, a signal of a first frequency band; means for estimating an ionospheric delay residual error based on the signal of the first frequency band; means for calculating a pseudorange measurement and a carrier phase measurement based on the estimated ionospheric delay residual error; and means for estimating a position using the pseudorange measurement and the carrier phase measurement.

In some implementations, a non-transitory computer-readable medium stores a set of instructions, the set of instructions comprising one or more instructions that, when executed by one or more processors of a UE, cause the UE to: receive, from a SV, a signal of a first frequency band; estimate an ionospheric delay residual error based on the signal of the first frequency band; calculate a pseudorange measurement and a carrier phase measurement based on the estimated ionospheric delay residual error; and estimate a position using the pseudorange measurement and the carrier phase measurement.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1A:
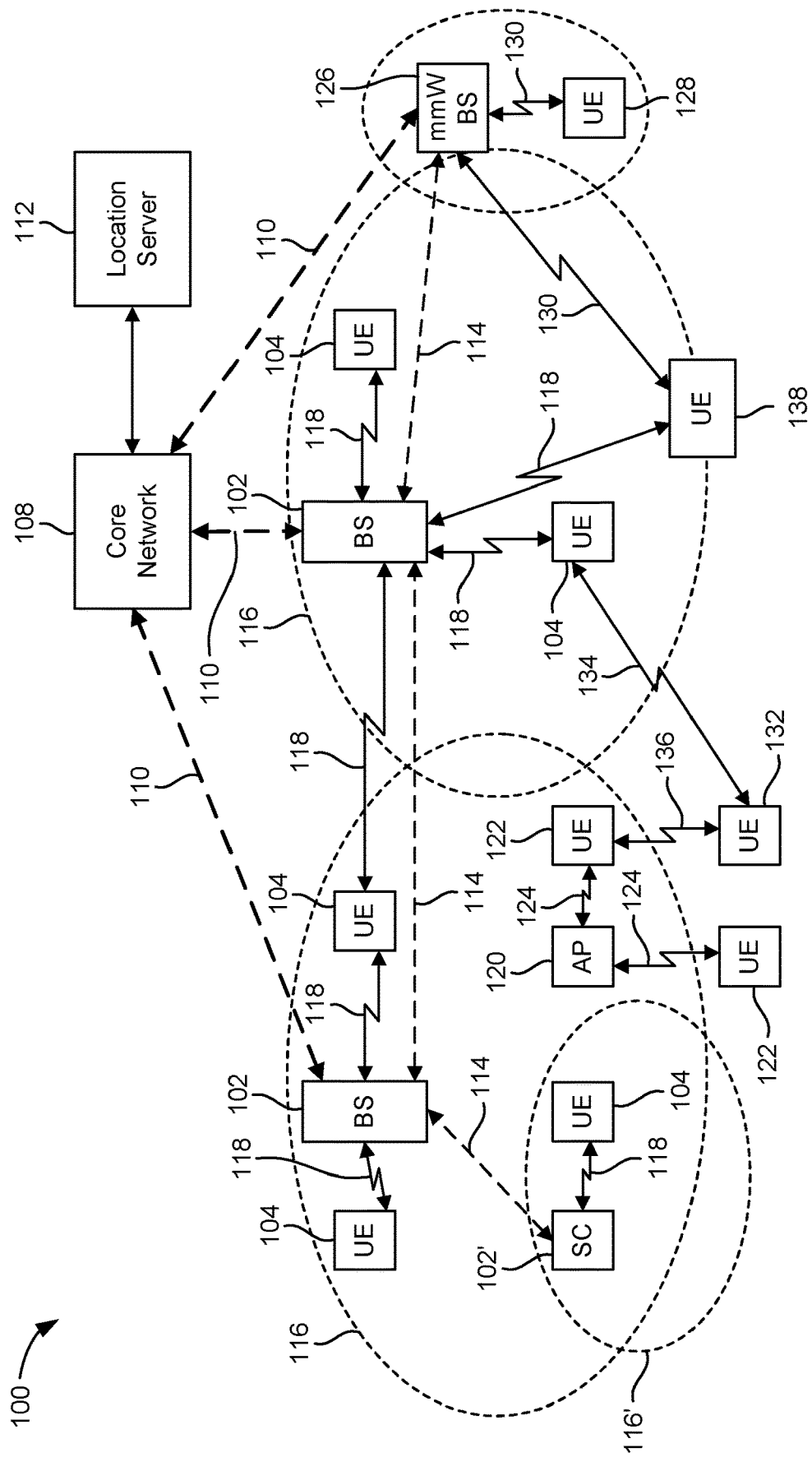
FIGS. 1A and 1B illustrate an exemplary wireless communications system according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Global navigation satellite system (GNSS) precise point positioning (PPP) is a technique which takes advantage of the frequency-dependent nature of ionospheric delay. The ionosphere is dispersive, meaning that signals of different frequencies are slow by different amounts. PPP uses measurements at two different frequencies—e.g., L1 and L5—to determine the delay caused by the ionosphere. By measuring the difference in the delays between signals of different frequencies, the receiver can model and remove the ionospheric delay. PPP use cases include autonomous driving, which requires centimeter (cm) to decimeter (dm) positioning accuracy and a 95% circular error probable (CEP) less than one meter, as well as some Internet of Things (IoT) and industrial applications.

Real time kinematics (RTK) is a technique that provides relative positioning information with respect to a reference station. In traditional RTK, due to very high spatial correlation between reference station and client device, the atmospheric delays including ionospheric delay are virtually fully canceled out after applying the RTK correction. Ultra-long baseline RTK also requires dual frequency measurements to calculate and correct for ionospheric delay. Thus, consumer grade receivers generally must be capable of quality carrier phase measurements as well as multi-constellation, multi-frequency (MCMF) operation.

However, not all GPS satellites support L1 and L5, which means that handsets that require multiple frequencies for estimation of ionospheric delay can't provide precise positioning via PPP or ultra-long baseline RTK.

A new global navigation satellite system (GNSS) precise point positioning (PPP) model and systems for using same are presented herein. The new PPP model does not require dual frequency measurements to estimate the ionospheric delay and is thus applicable in situations where signals in the L1 or L5 frequency are not available. Moreover, in situations where L1 and L5 are both available, the new PPP model provides better performance over conventional methods.

The words "exemplary" and "example" are used herein to mean "serving as an example, instance, or illustration." Any aspect described herein as "exemplary" or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (UT), a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network, to the Internet, or to both are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, signaling connections, or various combinations thereof for the supported UEs. In some systems a base station may provide purely edge node signaling functions while in other systems it may provide additional control functions, network management functions, or both. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, signaling connections, or various combinations thereof for UEs), but may instead transmit reference signals to UEs to be measured by the UEs, may receive and measure signals transmitted by the UEs, or both. Such a base station may be referred to as a positioning beacon (e.g., when transmitting signals to UEs), as a location measurement unit (e.g., when receiving and measuring signals from UEs), or both.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Figure 1B:
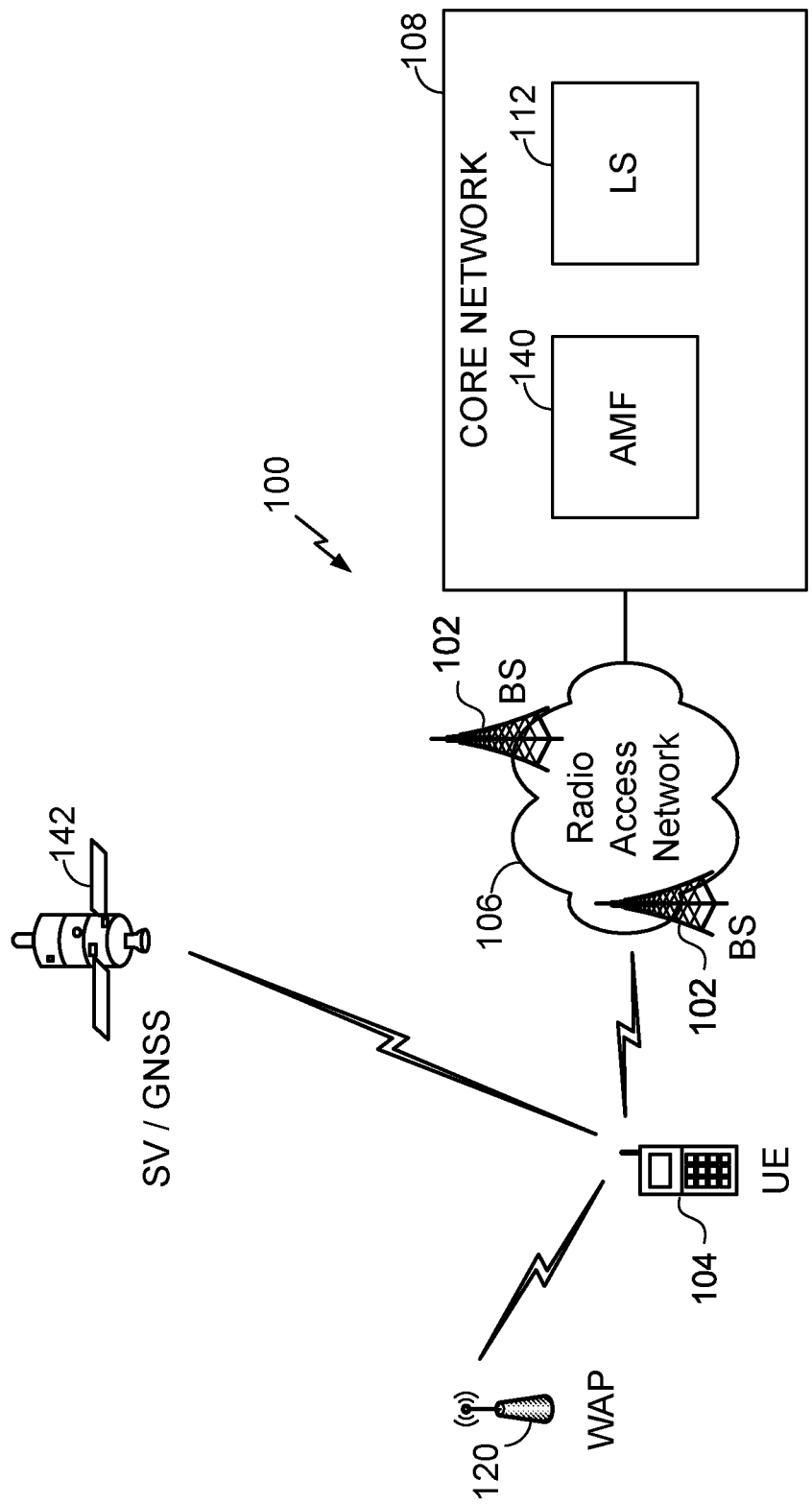

FIGS. 1A and 1B illustrate an exemplary wireless communications system 100 according to various aspects. In FIG. 1A, the wireless communications system 100 (which may also be referred to as a wireless wide area network (WWAN)) may include various base stations 102 and various UEs 104. The base stations 102 may include macro cell base stations (high power cellular base stations), small cell base stations (low power cellular base stations), or both. In an aspect, the macro cell base station may include eNBs, ng-eNBs, or both, where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a radio access network (RAN) 106 and interface with a core network 108 (e.g., an evolved packet core (EPC) or a 5G core (5GC)) through backhaul links 110, and through the core network 108 to one or more location servers 112 (which may be part of core network 108 or may be external to core network 108). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 114, which may be wired or wireless.

The base stations 102 may wirelessly communicate with the UEs 104. Each of the base stations 102 may provide communication coverage for a respective geographic coverage area 116. In an aspect, one or more cells may be supported by a base station 102 in each geographic coverage area 116. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 116.

While neighboring macro cell base station 102 geographic coverage areas 116 may partially overlap (e.g., in a handover region), some of the geographic coverage areas 116 may be substantially overlapped by a larger geographic coverage area 116. For example, a small cell base station 102' may have a coverage area 116' that substantially overlaps with the geographic coverage area 116 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 118 between the base stations 102 and the UEs 104 may include uplink (also referred to as reverse link) transmissions from a UE 104 to a base station 102, downlink (also referred to as forward link) transmissions from a base station 102 to a UE 104, or both. The communication links 118 may use MIMO antenna technology, including spatial multiplexing, beamforming, transmit diversity, or various combinations thereof. The communication links 118 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 120 in communication with WLAN stations (STAs) 122 via communication links 124 in an unlicensed frequency spectrum (e.g., 5 GHz). When communicating in an unlicensed frequency spectrum, the WLAN STAs 122, the WLAN AP 120, or various combinations thereof may perform a clear channel assessment (CCA) or listen before talk (LBT) procedure prior to communicating in order to determine whether the channel is available.

The small cell base station 102' may operate in a licensed, an unlicensed frequency spectrum, or both. When operating in an unlicensed frequency spectrum, the small cell base station 102' may employ LTE or NR technology and use the same 5 GHz unlicensed frequency spectrum as used by the WLAN AP 120. The small cell base station 102', employing LTE/5G in an unlicensed frequency spectrum, may boost coverage to the access network, increase capacity of the access network, or both. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 126 that may operate in mmW frequencies, in near mmW frequencies, or combinations thereof in communication with a UE 128. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 126 and the UE 128 may utilize beamforming (transmit, receive, or both) over a mmW communication link 130 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting, adjust the phase setting, or combinations thereof, of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal to interference plus noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), narrowband reference signals (NRS) tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/126, UEs 104/128) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/128 and the cell in which the UE 104/128 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/128 in a cell may have different downlink primary carriers. The same is true for the uplink primary carriers. The network is able to change the primary carrier of any UE 104/128 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1A, one of the frequencies utilized by the macro cell base stations 102 may be an anchor carrier (or "PCell") and other frequencies utilized by the macro cell base stations 102, the mmW base station 126, or combinations thereof may be secondary carriers ("SCells"). The simultaneous transmission, reception, or both of multiple carriers enables the UE 104/128 to significantly increase its data transmission rates, reception rates, or both. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 132, that connects indirectly to one or more communication networks via one or more device-to-device (D2D) peer-to-peer (P2P) links (referred to as "sidelinks"). In the example of FIG. 1A, UE 132 has a D2D P2P link 134 with one of the UEs 104 connected to one of the base stations 102 (e.g., through which UE 132 may indirectly obtain cellular connectivity) and a D2D P2P link 194 with WLAN STA 122 connected to the WLAN AP 120 (through which UE 132 may indirectly obtain WLAN-based Internet connectivity). In an example, the D2D P2P link 134 and D2D P2P link 136 may be supported with any well-known D2D RAT, such as LTE Direct (LTE-D), WiFi Direct (WiFi-D), Bluetooth®, and so on.

The wireless communications system 100 may further include a UE 138 that may communicate with a macro cell base station 102 over a communication link 118, with the mmW base station 126 over a mmW communication link 130, or combinations thereof. For example, the macro cell base station 102 may support a PCell and one or more SCells for the UE 138 and the mmW base station 126 may support one or more SCells for the UE 138.

FIG. 1B illustrates another aspect of the wireless communication system 100, e.g., that the core network 108 includes an access and mobility management function (AMF) 140 and that a UE 104 may communicate with one or more satellite vehicles (SVs), such as a global navigation satellite system (GNSS) vehicle 142, for example, in addition to a RAN 106, a WAP 120, etc.

Figure 2A:
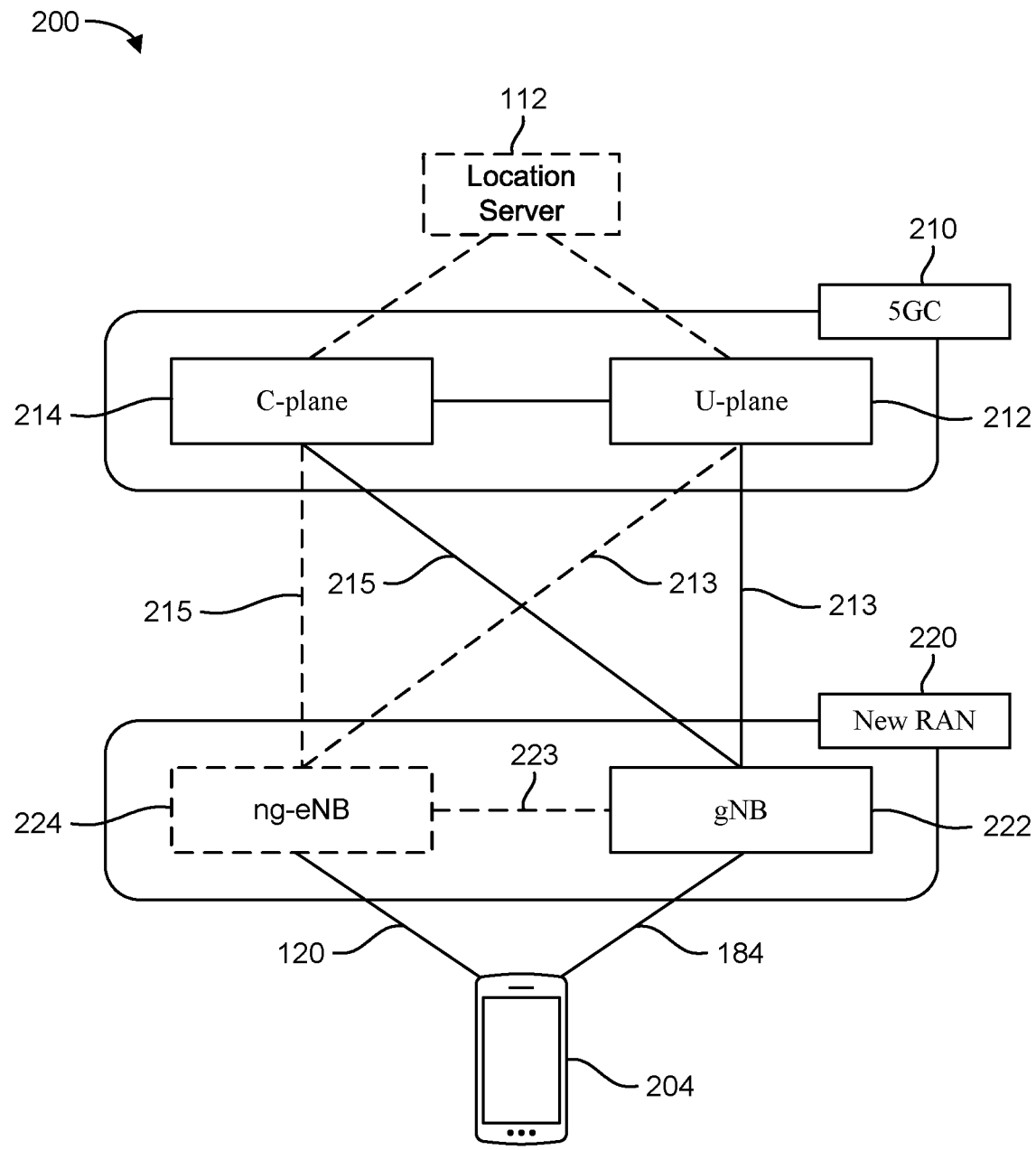
FIGS. 2A and 2B illustrate example wireless network structures according to various aspects.

FIG. 2A illustrates an example wireless network structure 200 according to various aspects. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1A). Another optional aspect may include a location server 112, which may be in communication with the 5GC 210 to provide location assistance for UEs 204. The location server 112 can be implemented as a plurality of separate servers (e.g., physically separate servers, different software modules on a single server, different software modules spread across multiple physical servers, etc.), or alternately may each correspond to a single server. The location server 112 can be configured to support one or more location services for UEs 204 that can connect to the location server 112 via the core network, 5GC 210, via the Internet (not illustrated), or via both. Further, the location server 112 may be integrated into a component of the core network, or alternatively may be external to the core network.

Figure 2B:
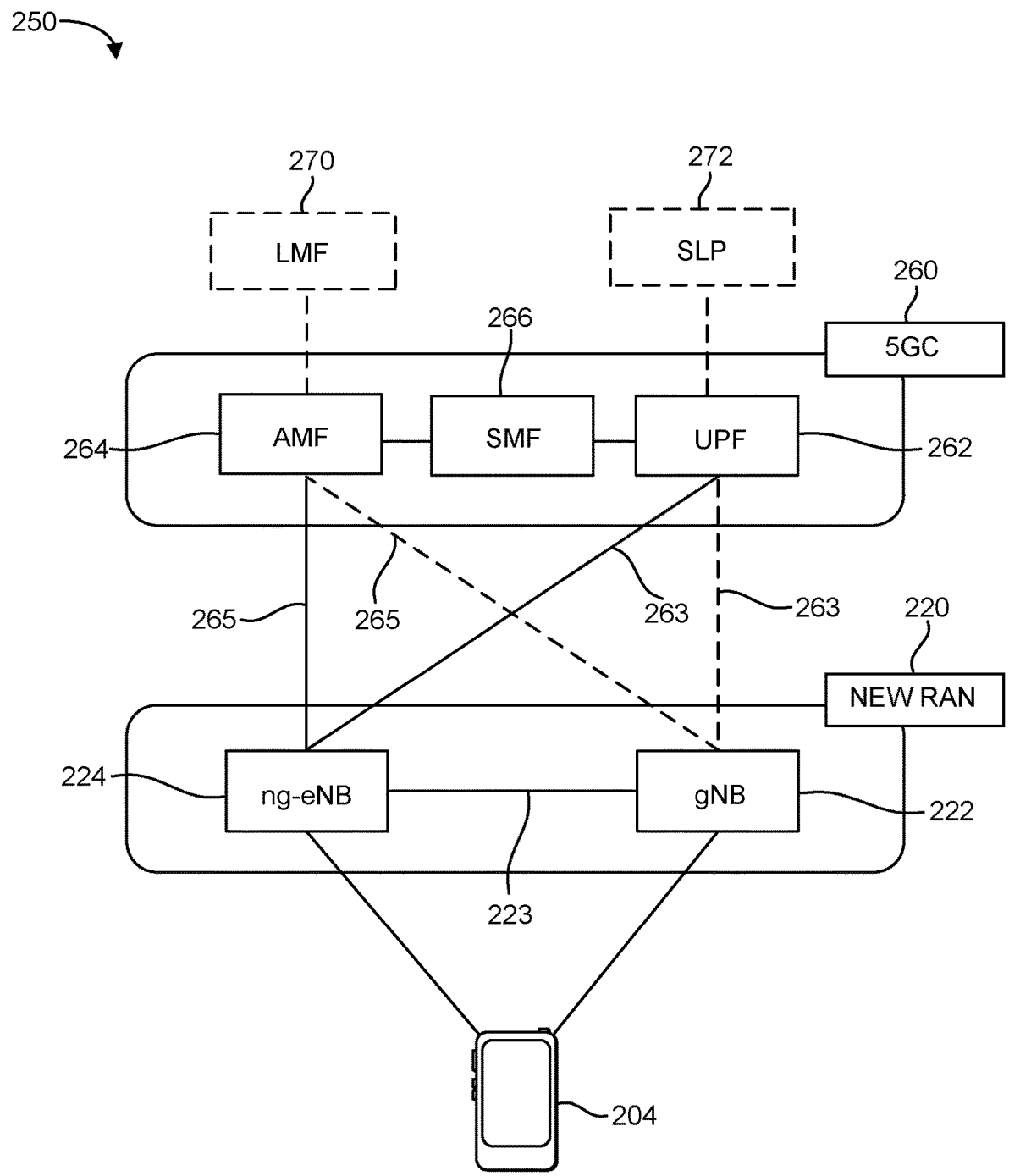

FIG. 2B illustrates another example wireless network structure 250 according to various aspects. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1A). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 112), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, via the Internet (not illustrated), or via both. The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice or data like the transmission control protocol (TCP) and/or IP).

In an aspect, the LMF 270, the SLP 272, or both may be integrated into a base station, such as the gNB 222 or the ng-eNB 224. When integrated into the gNB 222 or the ng-eNB 224, the LMF 270 or the SLP 272 may be referred to as a location management component (LMC). However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
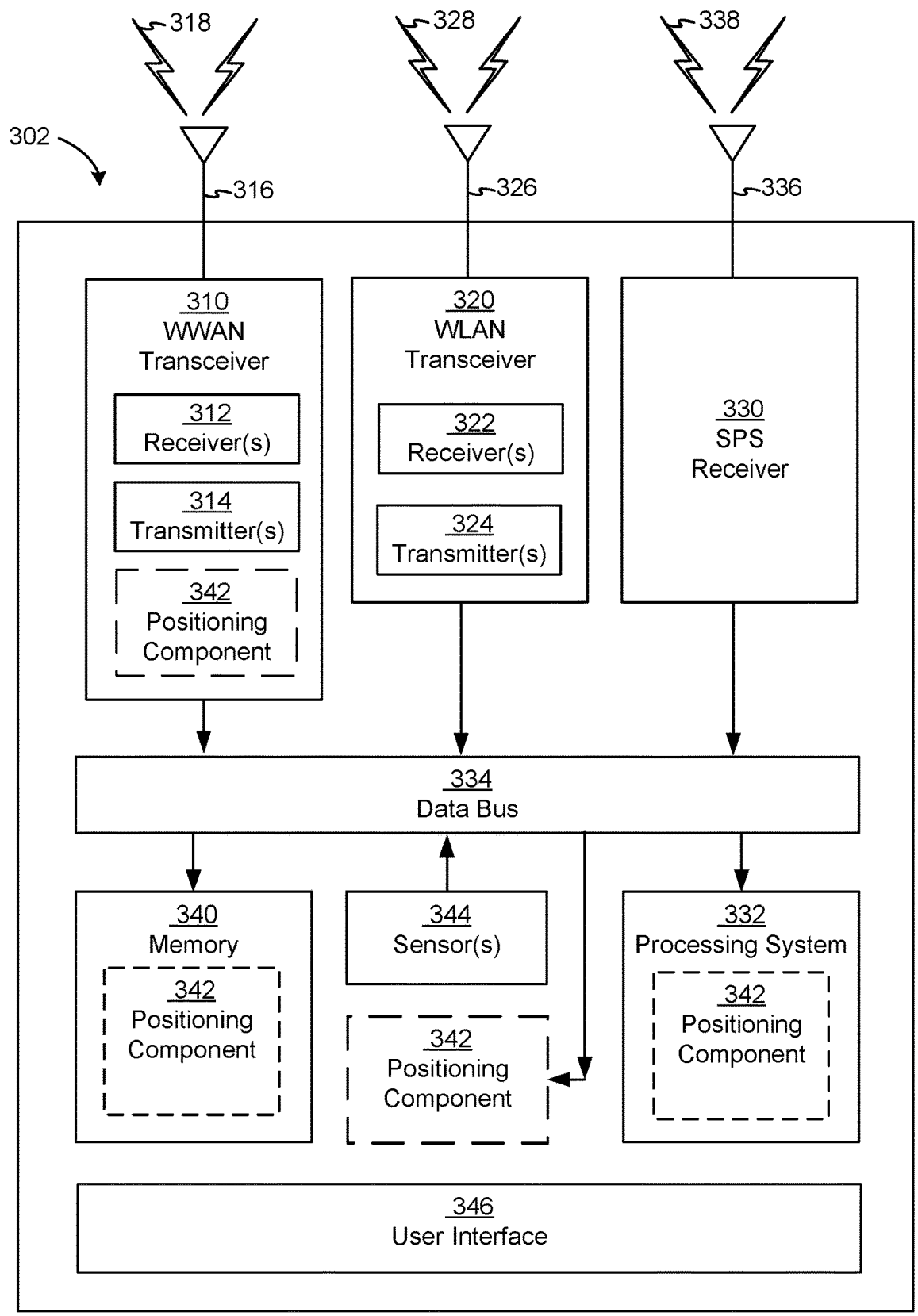
FIGS. 3A to 3C are simplified block diagrams of several sample aspects of components that may be employed in wireless communication nodes and configured to support communication as taught herein.
Figure 3B:
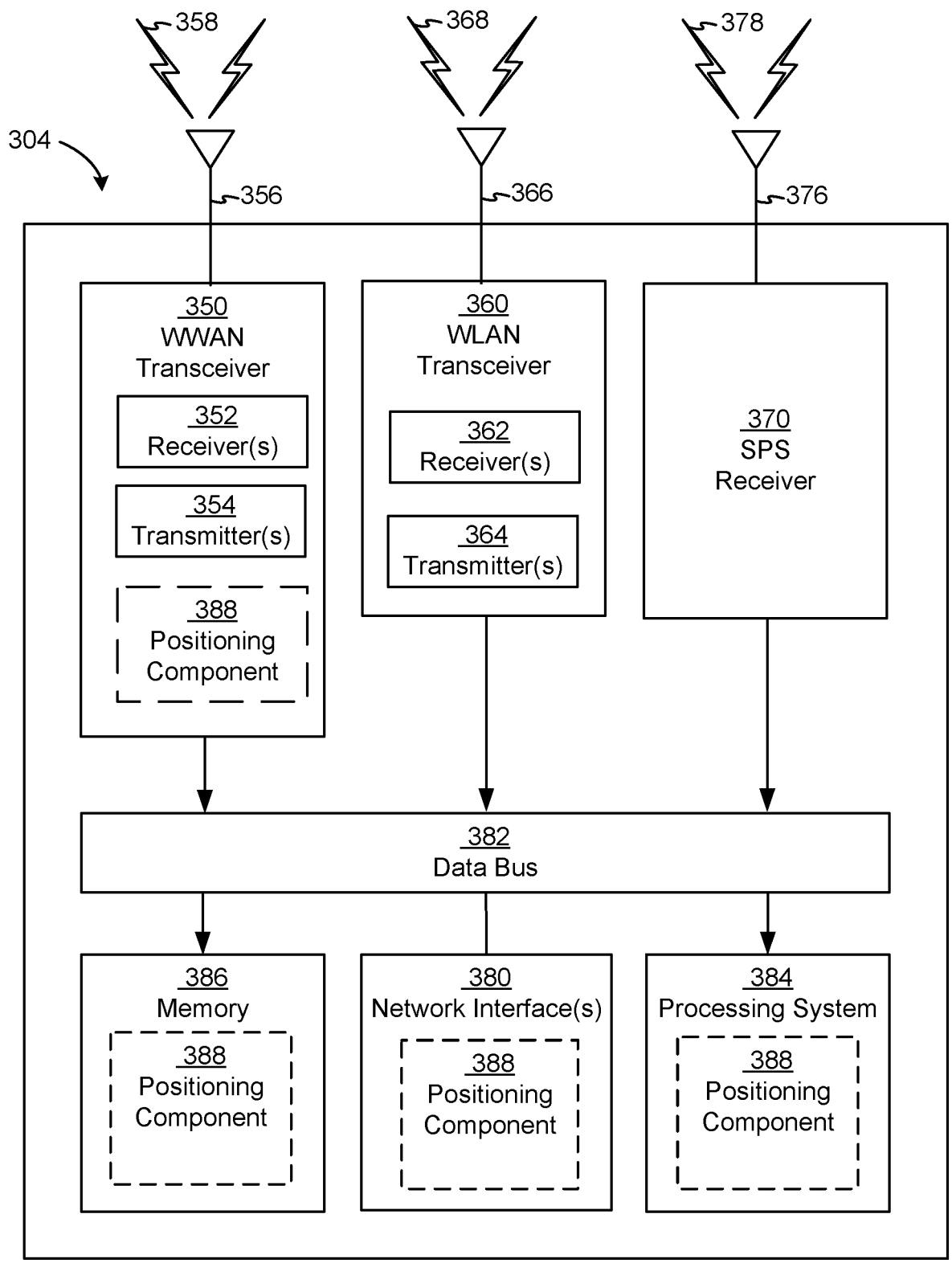
Figure 3C:
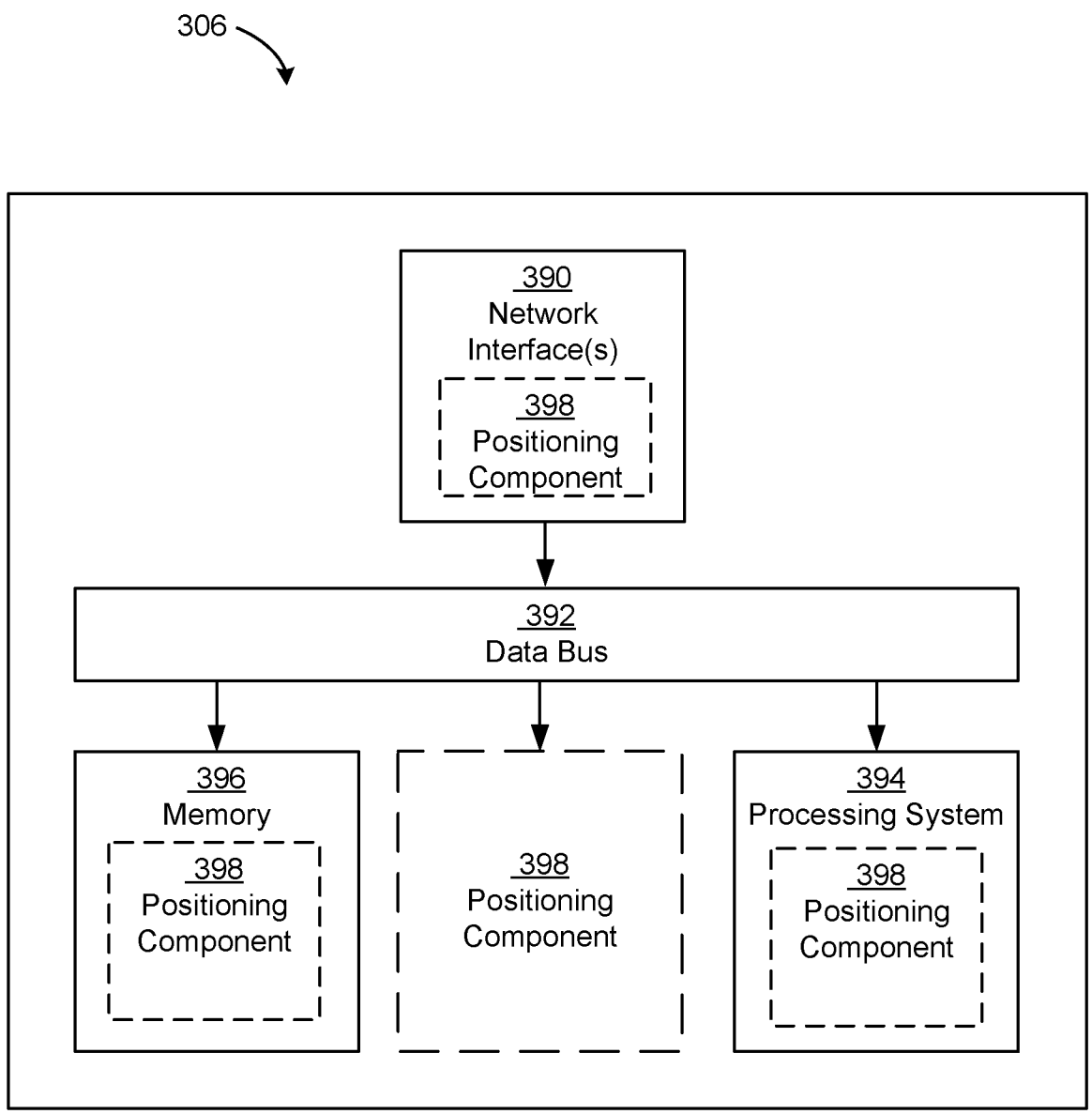

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 112 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers, communicate via different technologies, or both.

The UE 302 and the base station 304 each include wireless wide area network (WWAN) transceiver, such as WWAN transceiver 310 and WWAN transceiver 350, respectively, configured to communicate via one or more wireless communication networks (not shown), such as an NR network, an LTE network, a GSM network, or the like. The WWAN transceivers 310 and 350 may be connected to one or more antennas, such as antenna 316 and antenna 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signal 318 and signal 358 (e.g., messages, indications, information, and so on), respectively, and, conversely, for receiving and decoding signals (e.g., messages, indications, information, pilots, and so on), such as signal 318 and signal 358, respectively, in accordance with the designated RAT. Specifically, the WWAN transceivers 310 and 350 include one or more transmitters, such as transmitter 314 and transmitter 354, respectively, for transmitting and encoding signals 318 and 358, respectively, and one or more receivers, such as receiver 312 and receiver 352, respectively, for receiving and decoding signals 318 and 358, respectively.

The UE 302 and the base station 304 also include, at least in some cases, wireless local area network (WLAN) transceiver 320 and WLAN transceiver 360, respectively. The WLAN transceivers 320 and 360 may be connected to one or more antennas, such as antenna 326 and antenna 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals (e.g., messages, indications, information, and so on), such as signal 328 and signal 368, respectively, and, conversely, for receiving and decoding signals, such as signal 328 and signal 368, respectively, in accordance with the designated RAT. Specifically, the WLAN transceivers 320 and 360 include one or more transmitters, such as transmitter 324 and transmitter 364, respectively, for transmitting and encoding signals, such as signals 328 and 368, respectively, and one or more receivers, such as receiver 322 and receiver 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320, transceiver 350 and 360, or both) of the UE 302, the base station 304, or both may also comprise a network listen module (NLM) or the like for performing various measurements.

The UE 302 and the base station 304 also include, at least in some cases, satellite positioning systems (SPS) receivers, such as SPS receiver 330 and SPS receiver 370. The SPS receivers 330 and 370 may be connected to one or more antennas, such as antenna 336 and antenna 376, respectively, for receiving SPS signals, such as SPS signal 338 and SPS signal 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware, software, or both for receiving and processing the SPS signals 338 and 378, respectively. The SPS receivers 330 and 370 request information and operations as appropriate from the other systems, and perform calculations necessary to determine positions of the UE 302 and the base station 304 using measurements obtained by any suitable SPS algorithm.

The base station 304 and the network entity 306 each include at least one network interfaces, such as network interface 380 and network interface 390, for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, other types of information, or various combinations thereof.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing the memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the WWAN transceiver 310, the memory component 340, the processing system 332, or any combination thereof, or may be a standalone component. FIG. 3B illustrates possible locations of the positioning component 388, which may be part of the WWAN transceiver 350, the memory component 386, the processing system 384, or any combination thereof, or may be a standalone component. FIG. 3C illustrates possible locations of the positioning component 398, which may be part of the network interface(s) 390, the memory component 396, the processing system 394, or any combination thereof, or may be a standalone component.

The UE 302 may include one or more sensors 344 coupled to the processing system 332 to provide movement information, orientation information, or both that is independent of motion data derived from signals received by the WWAN transceiver 310, the WLAN transceiver 320, or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), any other type of movement detection sensor, or combinations thereof. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D or 3D coordinate systems.

In addition, the UE 302 includes a user interface 346 for providing indications (e.g., audible indications, visual indications, or both) to a user, for receiving user input (e.g., upon user actuation of a sensing device such a keypad, a touch screen, a microphone, and so on), or for both. Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time domain, in the frequency domain, or in both, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal, from channel condition feedback transmitted by the UE 302, or from both. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304 and the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data bus 334, data bus 382, and data bus 392, respectively. The components of FIGS. 3A-C may be implemented in various ways. In some implementations, the components of FIGS. 3A-C may be implemented in one or more circuits such as, for example, one or more processors, one or more ASICs (which may include one or more processors), or both. Here, each circuit may use or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code, by appropriate configuration of processor components, or by both). Similarly, some or all of the functionality represented by blocks 350 to 388 may be implemented by processor and memory component(s) of the base station 304 (e.g., by execution of appropriate code, by appropriate configuration of processor components, or by both). Also, some or all of the functionality represented by blocks 390 to 398 may be implemented by processor and memory component(s) of the network entity 306 (e.g., by execution of appropriate code, by appropriate configuration of processor components, or by both). For simplicity, various operations, acts, or functions are described herein as being performed "by a UE," "by a base station," "by a positioning entity," etc. However, as will be appreciated, such operations, acts, or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, narrowband reference signal (NRS), CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 112, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), other parameters applicable to the particular positioning method, or combinations thereof. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4:
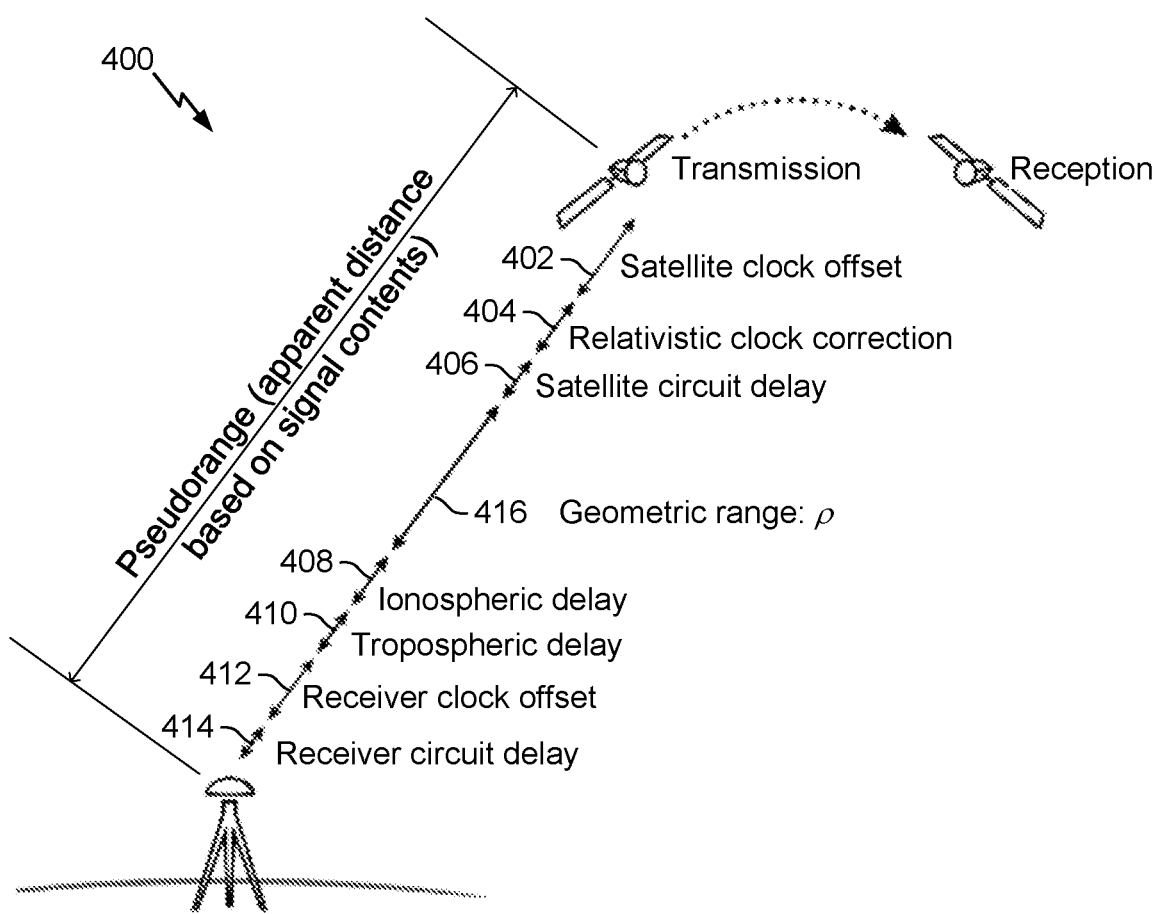
FIG. 4 illustrates a distance calculation based on a signal received from a satellite vehicle (SV) such as a GPS or other SV by a user on the surface of the Earth.

FIG. 4 illustrates a distance calculation 400 based on a signal received from a satellite vehicle (SV) such as a GPS or other SV by a user on the surface of the Earth. The distance to the SV is calculated based on the time that the signal takes to travel the distance from the SV to the receiver. The SV signal includes a ranging code, time stamp, or other content which the receiver can use to determine an apparent distance (called a pseudorange) to the SV based on the apparent travel time of the signal and the speed of light.

However, the apparent travel time presumes no delay to transmit the signal, no delay to process the received signal, and no delay in between the transmitter and receiver. Thus, to get an accurate distance, the time delays caused by various elements must be considered and accounted for. Some of the delays, and thus potential sources of pseudorange measurement errors, include the satellite clock offset 402 relative to the receiver clock, a relativistic clock correction 404, the delay caused by the satellite transmitter circuit 406, the ionospheric delay 408, the tropospheric delay 410, the receiver clock offset 412, and the receiver circuit delay 414. Once these delays are accounted for, the Euclidean distance between the satellite and receiver coordinates at the transmission and reception time, respectively—the geometric range (ρ) 416—can be determined. The tropospheric delay depends on the signal path through the neutral atmosphere and can thus be modeled as a function of the satellite elevation angle. Tropospheric effects are not frequency dependent for GNSS signals.

Figure 5:
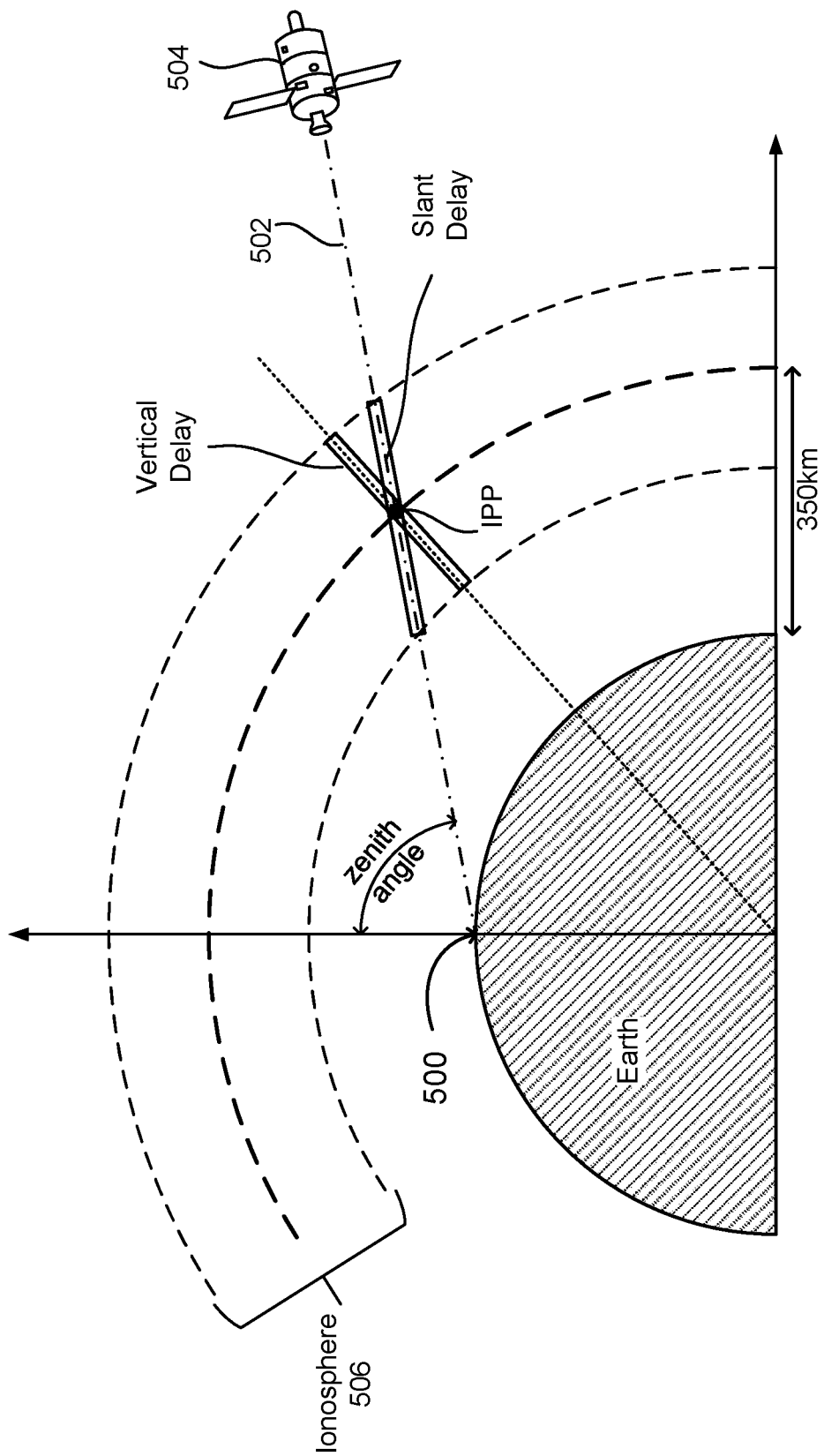
FIG. 5 illustrates some of the elements used to calculate ionospheric delay

FIG. 5 illustrates some of the elements used to calculate the ionospheric delay. In FIG. 5, a user 500 on the surface of the Earth is receiving a signal 502 from a satellite vehicle 504. The signal 502 is traveling through the ionosphere 506. If the user 500 was directly below the satellite vehicle 504, i.e., with a zenith angle=0, the signal 502 would travel the shortest distance through the ionosphere 506, resulting in the minimum delay, i.e., the vertical delay shown in FIG. 5. Since the zenith angle for user 500 is not zero, the signal 502 must travel through the ionosphere 506 at a slant, resulting in a slant delay. The ionosphere 506 is modeled as a surface 350 kilometers about the surface of the Earth, and the point of intersection of the signal 502 and this layer is referred to as the ionospheric pierce point (IPP).

In order to provide precise positioning, conventional PPP relies on two general sources of information: direct observables and ephemerides.

Direct observables are data that the GPS receiver can measure on its own. In addition to pseudorange, another direct observable for PPP is carrier phase, i.e., not only the timing message encoded in the GNSS signal, but also whether the wave of that signal is going "up" or "down" at a given moment. Loosely speaking, phase can be thought of as the digits after the decimal point in the number of waves between a given GNSS satellite and the receiver. By itself, phase measurement cannot yield even an approximate position, but once other methods have narrowed down the position estimate to within a diameter corresponding to a single wavelength (roughly 20 cm), phase information can refine the estimate.

Ephemerides are precise measurements of the GNSS satellites' orbits and clock, made by the geodetic community (the International GNSS Service and other public and private organizations) with global networks of ground stations. Satellite navigation works on the principle that the satellites' positions at any given time are known, but in practice, orbits are not perfectly predictable. The ephemerides that the satellites broadcast are earlier forecasts, up to a few hours old, and are less accurate (by up to a few meters) than carefully processed observations of where the satellites actually were. Therefore, if a GNSS receiver system stores raw observations, they can be processed later against a more accurate ephemeris than what was in the GNSS messages, yielding more accurate position estimates than what would be possible with standard real time calculations.

One challenge for PPP is that ionospheric delay 408 (e.g., the slant delay shown in FIG. 5) is not constant, and varies depending on solar activity among other things. Thus, to provide accurate positioning, the various delays, including the delay caused by the ionosphere, must be compensated for. The ionosphere is dispersive, meaning that signals of different frequency are slowed by different amounts.

Conventional PPP implementations take advantage of the frequency-dependent nature of ionospheric delay to provide such compensation. By measuring the difference in the delays between signals of different frequencies, the receiver software (or later post-processing) can model and remove the delay at any frequency. This process is only approximate, and non-dispersive sources of delay remain (notably from water vapor moving around in the troposphere), but it improves accuracy significantly. The conventional PPP model defines the following equations:

$$P_{IF}=\rho+dT+dTrop+\epsilon_{P_{IF}}$$

$$\Phi_{IF}=\rho+dT+dTrop+A_{IF}+\epsilon_{\Phi_{IF}}$$

where
  $P_{IF}$=ionosphere-free pseudorange combination (L1/L5), in meters (m)

$$=\frac{f_{L1}^2 R_{P_{L1}} - f_{L5}^2 R_{P_{L5}}}{f_{L1}^2 - f_{L5}^2},$$

where $R_P$ is a code based measurement
  $\Phi_{IF}$=ionosphere-free carrier phase combination (L1/L5) (m)

$$=\frac{f_{L1}^2 \Phi_{L1} - f_{L5}^2 \Phi_{L5}}{f_{L1}^2 - f_{L5}^2},$$

where $\Phi_L$, is a carrier phase measurement
  ρ=geometric range (m)
  dT=receiver clock error, determined by ionosphere-free pseudorange combination (L1/L5) (m)
  dTrop=troposphere delay residual, which is the difference between the modeled troposphere delay and the true troposphere delay (m)
  $A_{IF}$=non-integer ambiguity term for ionosphere-free carrier phase combination (L1/L5) (m)
  ε=noise and multipath error (m)

Conventional PPP techniques, however, have technical disadvantages. For example, in conventional PPP, the values of $P_{IF}$ and $\Phi_{IF}$ are determined based on measurements on two frequencies, L1 and L5. Therefore, the standard PPP equations above cannot be used unless both L1 and L5 are available.

In order to overcome the technical problem of calculating a precise point position when only one frequency is available, (e.g., where L1 or L5, but not both, are available), a new PPP method is presented, which uses observables without any ionosphere-free combination and which estimates the ionosphere delay residual error, dIono.

In one aspect, the following equations are used to calculate a precise point position when only a single frequency, $f_0$, is available:

$$P_{f_0} = \rho + dT + dTrop + \frac{dIono}{f_{f_0}^2} + \epsilon_{P_{f_0}}$$

$$\Phi_{f_0} = \rho + dT + dTrop - \frac{dIono}{f_{f_0}^2} + \lambda_{f_0}(N_{f_0} + r_{f_0} - s_{f_0}) + \epsilon_{\Phi_{f_0}}$$

where
P=pseudorange measurement (m)
Φ=carrier phase measurement (m)
ρ=geometry range (m)
dT=receiver clock error determined by $f_0$ pseudorange (m)
dTrop=troposphere delay residual, which is the difference between the modeled troposphere delay and the true troposphere delay (m)
dIono=ionosphere delay residual, which is the difference between the modeled ionosphere delay and the true ionosphere delay (m)
λ=wavelength of the transmitted signal (m/cycle)
N=integer ambiguity term (cycle)
r=ambiguity receiver fractional bias term (cycle)
s=ambiguity satellite fractional bias term (cycle)
$\epsilon_p$, $\epsilon_\Phi$=noise and multipath error (m)

Examples of $f_0$ include, but are not limited to, a frequency in the L1 band, a frequency in the L2 band, a frequency in the L5 band, a frequency in the E1 band, or a frequency in the E5 band.

This method may also be used where two frequencies may be available. For example, where either L1 or L5, but not necessarily both, are available, the following equations are used:

$$P_{L1} = \rho + dT + dTrop + \frac{dIono}{f_{L1}^2} + \epsilon_{P_{L1}}$$

$$\Phi_{L1} = \rho + dT + dTrop - \frac{dIono}{f_{L1}^2} + \lambda_{L1}(N_{L1} + r_{L1} - s_{L1}) + \epsilon_{\Phi_{L1}}$$

$$P_{L5} = \rho + dT + ISTB_{L5} + dTrop + \frac{dIono}{f_{L5}^2} + \epsilon_{P_{L5}}$$

$$\Phi_{L5} = \rho + dT + ISTB_{L5} + dTrop - \frac{dIono}{f_{L5}^2} + \lambda_{L5}(N_{L5} + r_{L5} - s_{L5}) + \epsilon_{\Phi_{L5}}$$

where
P=pseudorange measurement (m)
Φ=carrier phase measurement (m)
ρ=geometry range (m)
dT=receiver clock error determined by L1 pseudorange (m)
ISTB=inter-system time biases to be estimated (m)
dTrop=troposphere delay residual, which is the difference between the modeled troposphere delay and the true troposphere delay (m)
dIono=ionosphere delay residual, which is the difference between the modeled ionosphere delay and the true ionosphere delay (m)
λ=wavelength of the transmitted signal (m/cycle)
N=integer ambiguity term (cycle)
r=ambiguity receiver fractional bias term (cycle)
s=ambiguity satellite fractional bias term (cycle)
$\epsilon_p$, $\epsilon_\Phi$=noise and multipath error (m)

ISTB is the offset between receiver clocks between different signal bands, and compensates for the timing difference between data received on one frequency and data received on another frequency. In the equations above, dT is the receiver clock estimate for the L1 band, so the receiver clock for the L5 band would be dT+$ISTB_{L5}$. (The equations above could also be considered to include an $ISTB_{L1}$, albeit with a zero delay.) On the other hand, if dT was determined by L5 pseudorange measurements, then the equations for $P_{L1}$ and $\Phi_{L1}$ would include a $ISTB_{L1}$ term with a non-zero value and $ISTB_{L5}$ would be zero. In some aspects, the ISTB will be an estimated state in an extended Kalman filter (EKF) estimation. It is presumed that the ISTB value will be the same for all SVs within the same signal type, and will not change dramatically over time; it is feasible, therefore, to estimate ISTB.

In some aspects, the value for dIono may be estimated using a Klobuchar model or other models, such as the NeQuick-G model. In some aspects, the model computed ionosphere value will be scaled up according to the signal frequency.

For example, if only L1 signals are available from a SV, then the equations for $P_{L1}$ and $\Phi_{L1}$ would be used; if only L5 signals are available from the SV, then the equations for $P_{L5}$ and $\Phi_{L5}$ would be used; and if both L1 and L5 signals are available from the SV, then the equations for $P_{L1}$, $\Phi_{L1}$, $P_{L5}$, and $\Phi_{L5}$ may all be used.

In some aspects, after applying the modeled slant ionosphere value, the slant ionosphere residuals will be different for different SVs. In one approach, the slant ionosphere residuals may be estimated directly for each SV in the EKF estimation. In another approach, the vertical ionosphere residual is directly estimated for each SV in the EKF estimation, and the ionospheric mapping function will be determined by SV line of sight information and the location of the pierce point at the ionosphere layer. It is presumed that the estimated slant or vertical ionosphere residuals are not changing dramatically over time; it is feasible, therefore, to estimate dIono.

Figure 6:
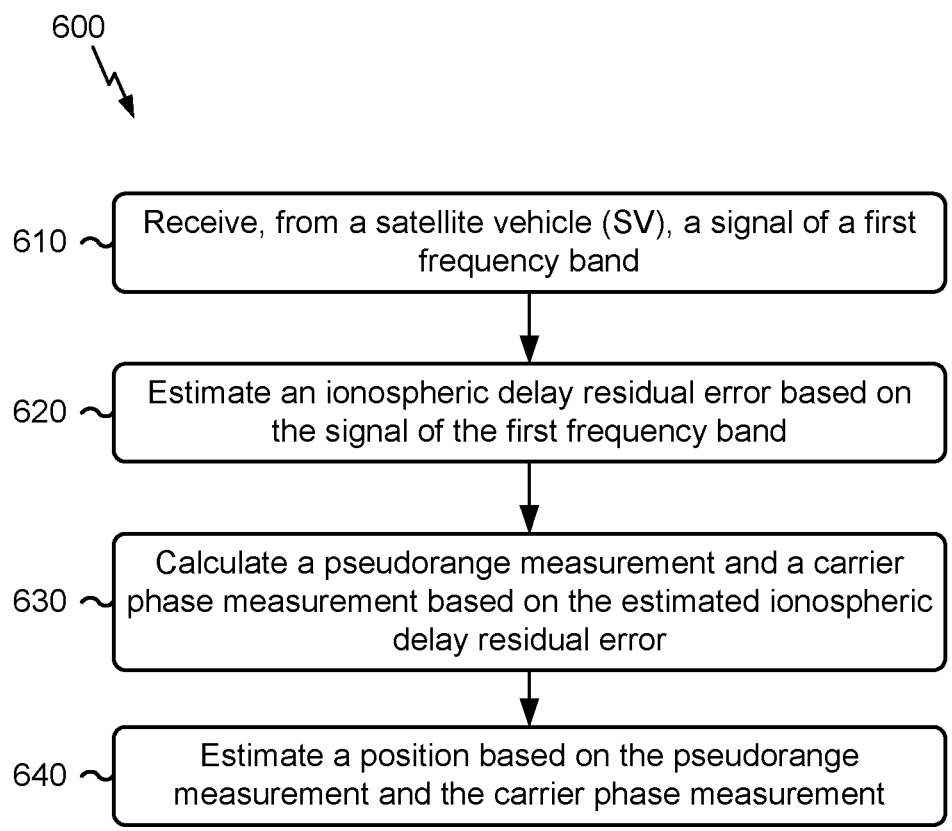
FIG. 6 is a flow chart illustrating a method 600 for GNSS PPE with estimated ionosphere according to some aspects.

FIG. 6 is a flow chart illustrating a method 600 for GNSS PPE with estimated ionosphere according to some aspects. In some aspects, one or more process blocks of FIG. 6 may be performed by a user equipment (UE) (e.g., user equipment (UE) 302). In some aspects, one or more process blocks of FIG. 6 may be performed by another device or a group of devices separate from or including the user equipment (UE). Additionally, or alternatively, one or more process blocks of FIG. 6 may be performed by one or more components of device 3A00, such as processor 3A20, memory 3A30, storage component 3A40, input component 3A50, output component 3A60, and/or communication interface 3A70.

As shown in FIG. 6, method 600 may include at a user equipment (UE): receiving, from a satellite vehicle (SV), a signal of a first frequency band (block 610); estimating an ionospheric delay residual error based on the signal of the first frequency band (block 620); calculating a pseudorange measurement and a carrier phase measurement based on the estimated ionospheric delay residual error (block 630); and estimating a position using the pseudorange measurement and the carrier phase measurement (block 640). For example, the UE any of the UE described herein.

Method 600 may include additional aspects, such as any single aspect or any combination of aspects described below and/or in connection with one or more other processes described elsewhere herein.

In an aspect, calculating the pseudorange measurement or the carrier phase measurement comprises calculating the pseudorange measurement or the carrier phase measurement based on the estimated ionospheric delay and a geometry range, a receiver clock timing, an inter-system time bias, a tropospheric delay residual error, an ambiguity term, a noise or multipath delay, or combinations thereof.

In an aspect, calculating the pseudorange measurement comprises calculating the pseudorange measurement according to any of the new pseudorange equations disclosed herein and using a first frequency band. In some aspects, calculating the pseudorange measurement comprises calculating the pseudorange measurement using at least one additional frequency band.

In an aspect, calculating the carrier phase measurement comprises calculating the carrier phase measurement according to any of the new carrier phase measurement equations disclosed herein and using a first frequency band. In some aspects, calculating the carrier phase measurement comprises calculating the carrier phase measurement using at least one additional frequency band.

In an aspect, estimating an ionospheric delay residual error based on the signal of the first frequency band comprises estimating the ionospheric delay residual error based on a Klobuchar equation.

In an aspect, the first frequency band comprises an L1 band, an L2 band, an L5 band, an E1 band, or an E5 band.

Although FIG. 6 shows example blocks of method 600, in some aspects, method 600 may include additional blocks, fewer blocks, different blocks, or differently arranged blocks than those depicted in FIG. 6. Additionally, or alternatively, two or more of the blocks of method 600 may be performed in parallel.

Figure 7:
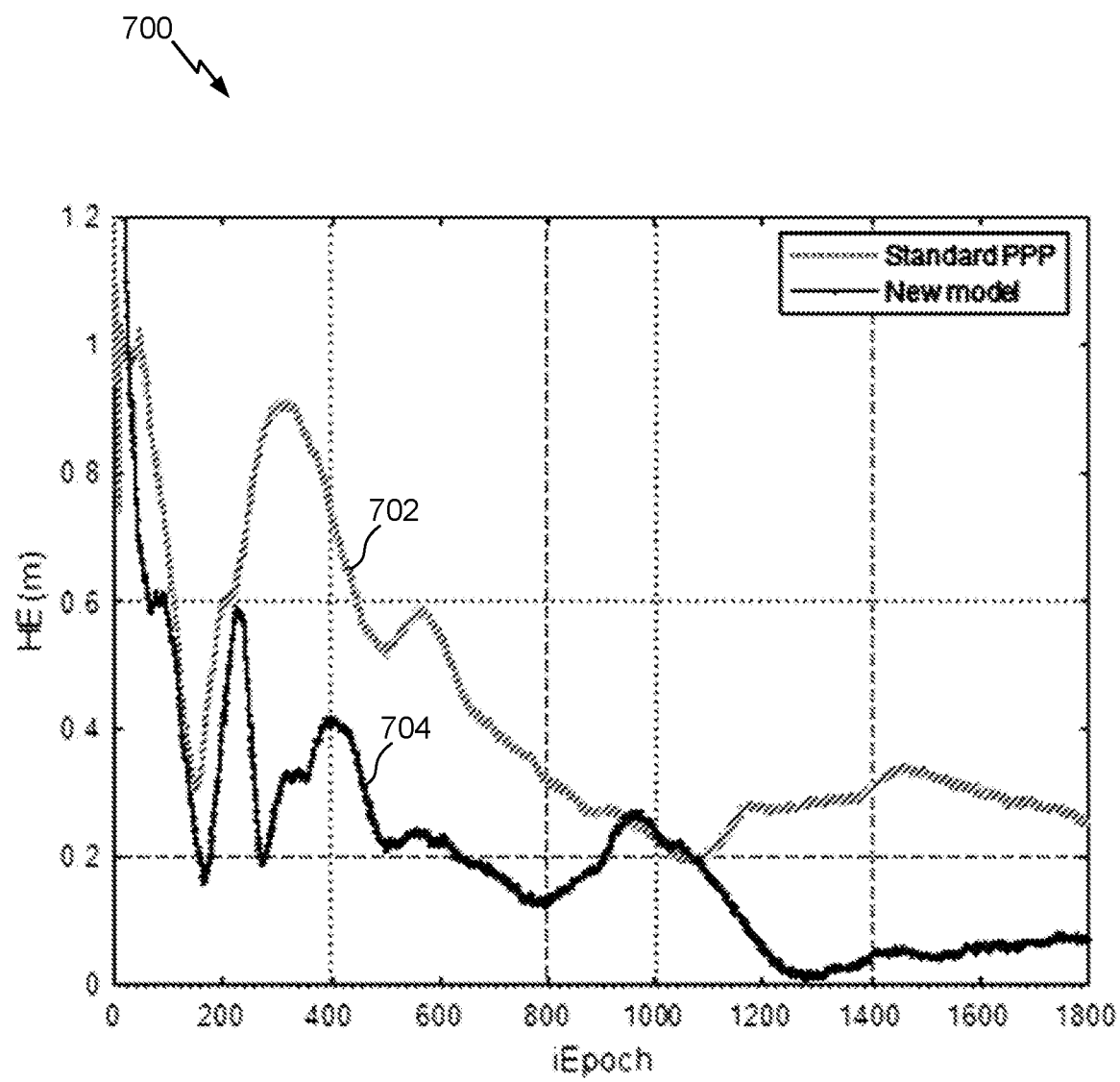
FIGS. 7 and 8 are graphs comparing the performance of the standard PPP model to the new PPP model according to some aspects.
Figure 8:
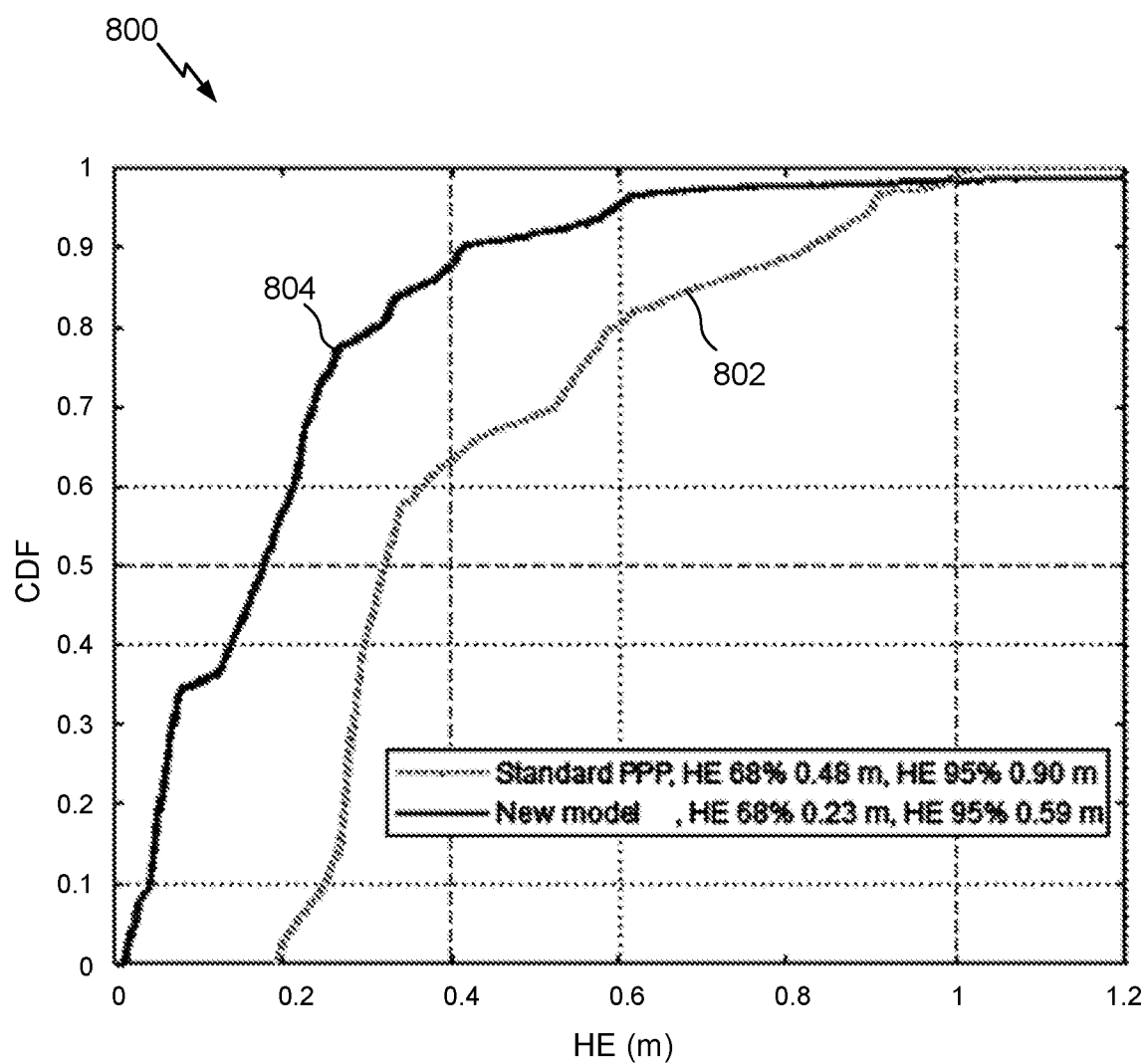

FIGS. 7 and 8 are graphs comparing the performance of the standard PPP model to the new PPP model according to some aspects, in situations where both L1 and L5 are available.

FIG. 7 is a graph 700 of the horizontal error (HE) over time, comparing performance of the standard PPP model 702 to the new PPP model 704. It can be seen that new PPP model 704 performs better than the standard PPP model 702, e.g., by demonstrating a lower HE than the standard PPP model and reaching lower HE values more quickly than the standard PPP model does.

FIG. 8 is a graph 800 of the cumulative distribution functions (CDFs) for horizontal error (HE) for the standard PPP model 802 and the new PPP model 804. The standard model 802 demonstrates a 68% HE at 0.48 and a 95% HE at 0.90, while the new model 804 demonstrates better performance, achieving 68% HE at 0.24 and 95% HE at 0.59.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Implementation examples are described in the following numbered clauses:

Clause 1. A method for precise point positioning (PPP), the method comprising: at a user equipment (UE): receiving, from a satellite vehicle (SV), a signal of a first frequency band; estimating a first ionospheric delay residual error based on the signal of the first frequency band; calculating a first pseudorange measurement and a first carrier phase measurement based on the first ionospheric delay residual error; and estimating a position using the first pseudorange measurement and the first carrier phase measurement.

Clause 2. The method of clause 1, wherein calculating the first pseudorange measurement or the first carrier phase measurement based on the ionospheric delay residual error comprises calculating the first pseudorange measurement or the first carrier phase measurement based on the first ionospheric delay residual error and at least one of: a geometry range, a receiver clock timing, an inter-system time bias, a tropospheric delay residual error, an ambiguity term, a noise or multipath delay, or combinations thereof.

Clause 3. The method of clause 1 or 2, wherein calculating the first pseudorange measurement comprises calculating the first pseudorange measurement according to the equation $$P_{f1} = \rho + dT + dTrop + \frac{dIono}{f_1^2} + \epsilon_{P_{f1}},$$

where $P_{f1}$ comprises a pseudorange measurement based on a first frequency f1, $\rho$ comprises a geometry range, dT comprises a receiver clock error determined by $P_{f1}$, dTrop comprises a troposphere delay residual error, dIono comprises an ionosphere delay residual error, and $\epsilon_P$ comprises a noise and multipath error.

Clause 4. The method of any of clauses 1-3, wherein calculating the first carrier phase measurement comprises calculating the first carrier phase measurement according to the equation $$\Phi_{f1} = \rho + dT + dTrop - \frac{dIono}{f_1^2} + \lambda_{f1}(N_{f1} + r_{f1} - s_{f1}) + \epsilon_{\Phi_{f1}},$$

where $\Phi_{f1}$ comprises a carrier phase measurement based on the first frequency f1, $\rho$ comprises a geometry range, dT comprises a receiver clock error determined by $P_{f1}$, dTrop comprises a troposphere delay residual error, dIono comprises an ionosphere delay residual error, comprises a wavelength of the received signal, N comprises an integer ambiguity term, comprises an ambiguity receiver fractional bias term, s comprises an ambiguity satellite fractional bias term, and $\epsilon_\Phi$ comprises a noise and multipath error.

Clause 5. The method of any of clauses 1-4, wherein estimating a first ionospheric delay residual error based on the signal of the first frequency band comprises estimating the first ionospheric delay residual error based on a Klobuchar equation.

Clause 6. The method of any of clauses 1-5, wherein the first frequency band comprises an L1 band, an L2 band, an L5 band, an E1 band, or an E5 band.

Clause 7. The method of any of clauses 1-6, wherein estimating a position using the first pseudorange measurement and the first carrier phase measurement comprises performing ultra-long baseline real-time kinematics (RTK) positioning.

Clause 8. The method of any of clauses 1-7, further comprising: receiving, from the SV, a signal of a second frequency band; estimating a second ionospheric delay residual error based on the signal of the second frequency band; and calculating a second pseudorange measurement and a second carrier phase measurement based on the second ionospheric delay residual error; wherein estimating the position using the first pseudorange measurement and the first carrier phase measurement comprises estimating the position using the first pseudorange measurement, the first carrier phase measurement, the second pseudorange measurement, and the second carrier phase measurement.

Clause 9. The method of clause 8, wherein calculating the second pseudorange measurement comprises calculating the second pseudorange measurement according to the equation $$P_{f2} = \rho + dT + dTrop + \frac{dIono}{f_2^2} + \epsilon_{P_{f2}},$$

where $P_{f2}$ comprises a pseudorange measurement based on a second frequency f2, $\rho$ comprises a geometry range, dT comprises a receiver clock error determined by $P_{f1}$, dTrop comprises a troposphere delay residual error, dIono comprises an ionosphere delay residual error, and $\epsilon_P$ comprises a noise and multipath error.

Clause 10. The method of clause 9, wherein calculating the second carrier phase measurement comprises calculating the second carrier phase measurement according to the equation $$\Phi_{f2} = \rho + dT + dTrop - \frac{dIono}{f_2^2} + \lambda_{f2}(N_{f2} + r_{f2} - s_{f2}) + \epsilon_{\Phi_{f2}},$$

where $\Phi_{f2}$ comprises a carrier phase measurement based on the second frequency f2, $\rho$ comprises a geometry range, dT comprises a receiver clock error determined by $P_{f1}$, dTrop comprises a troposphere delay residual error, dIono comprises an ionosphere delay residual error, A comprises a wavelength of the received signal, N comprises an integer ambiguity term, comprises an ambiguity receiver fractional bias term, s comprises an ambiguity satellite fractional bias term, and $\epsilon_\Phi$ comprises a noise and multipath error.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for precise point positioning (PPP), the method comprising:
at a user equipment (UE):
receiving, from a satellite vehicle (SV), a signal of a first frequency band;
estimating a first ionospheric delay residual error based on the signal of the first frequency band;
calculating a first pseudorange measurement and a first carrier phase measurement based on the first ionospheric delay residual error; and estimating a position using the first pseudorange measurement and the first carrier phase measurement.

2. The method of claim 1, wherein calculating the first pseudorange measurement or the first carrier phase measurement based on the first ionospheric delay residual error comprises calculating the first pseudorange measurement or the first carrier phase measurement based on the first ionospheric delay residual error and at least one of: a geometry range, a receiver clock timing, an inter-system time bias, a tropospheric delay residual error, an ambiguity term, a noise or multipath delay, or combinations thereof.

3. The method of claim 2, wherein calculating the first pseudorange measurement comprises calculating the first pseudorange measurement according to equation $$P_{f1} = \rho + dT + dTrop + \frac{dIono}{f_1^2} + \epsilon_{P_{f1}},$$

wherein:
$P_{f1}$ comprises a pseudorange measurement based on a first frequency f1;
$\rho$ comprises a geometry range;
dT comprises a receiver clock error determined by $P_{f1}$;
dTrop comprises a troposphere delay residual error;
dIono comprises an ionosphere delay residual error; and
$\epsilon_p$ comprises a noise and multipath error.

4. The method of claim 3, wherein calculating the first carrier phase measurement comprises calculating the first carrier phase measurement according to equation $$\Phi_{f1} = \rho + dT + dTrop - \frac{dIono}{f_1^2} + \lambda_{f1}(N_{f1} + r_{f1} - s_{f1}) + \epsilon_{\Phi_{f1}},$$

wherein:
$\Phi_{f1}$ comprises a carrier phase measurement based on the first frequency f1;
$\rho$ comprises a geometry range;
dT comprises a receiver clock error determined by $P_{f1}$;
dTrop comprises a troposphere delay residual error;
dIono comprises an ionosphere delay residual error;
$\lambda$ comprises a wavelength of the signal;
N comprises an integer ambiguity term;
r comprises an ambiguity receiver fractional bias term;
s comprises an ambiguity satellite fractional bias term; and
$\epsilon_\Phi$ comprises a noise and multipath error.

5. The method of claim 1, wherein estimating a first ionospheric delay residual error based on the signal of the first frequency band comprises estimating the first ionospheric delay residual error based on a Klobuchar equation.

6. The method of claim 1, wherein the first frequency band comprises an L1 band, an L2 band, an L5 band, an E1 band, or an E5 band.

7. The method of claim 1, wherein estimating a position using the first pseudorange measurement and the first carrier phase measurement comprises performing ultra-long baseline real-time kinematics (RTK) positioning.

8. The method of claim 1, further comprising:
receiving, from the SV, a signal of a second frequency band;
estimating a second ionospheric delay residual error based on the signal of the second frequency band; and
calculating a second pseudorange measurement and a second carrier phase measurement based on the second ionospheric delay residual error;
wherein estimating the position using the first pseudorange measurement and the first carrier phase measurement comprises estimating the position using the first pseudorange measurement, the first carrier phase measurement, the second pseudorange measurement, and the second carrier phase measurement.

9. The method of claim 8, wherein calculating the second pseudorange measurement comprises calculating second first pseudorange measurement according to equation $$P_{f2} = \rho + dT + ISTB_{f2} + dTrop + \frac{dIono}{f_2^2} + \epsilon_{P_{f2}},$$

wherein:
$P_{f2}$ comprises a pseudorange measurement based on a second frequency f2;
$\rho$ comprises a geometry range;
dT comprises a receiver clock error determined by $P_{f1}$;
$ISTB_{f2}$ comprises an inter-system time bias;
dTrop comprises a troposphere delay residual error;
dIono comprises an ionosphere delay residual error; and
$\epsilon_p$ comprises a noise and multipath error.

10. The method of claim 9, wherein calculating the second carrier phase measurement comprises calculating the second carrier phase measurement according to equation $$\Phi_{f2} = \rho + dT + ISTB_{f2} + dTrop - \frac{dIono}{f_2^2} + \lambda_{f2}(N_{f2} + r_{f2} - s_{f2}) + \epsilon_{\Phi_{f2}},$$

wherein:
$\Phi_{f2}$ comprises a carrier phase measurement based on the second frequency f2;
$\rho$ comprises a geometry range;
dT comprises a receiver clock error determined by $P_{f1}$;
$ISTB_{f2}$ comprises an inter-system time bias;
dTrop comprises a troposphere delay residual error;
dIono comprises an ionosphere delay residual error;
$\lambda$ comprises a wavelength of the signal;
N comprises an integer ambiguity term;
r comprises an ambiguity receiver fractional bias term;
s comprises an ambiguity satellite fractional bias term; and
$\epsilon_\Phi$ comprises a noise and multipath error.

11. A user equipment (UE), comprising:
a memory;
at least one transceiver; and
one or more processors communicatively coupled to the memory and the at least one transceiver, the one or more processors configured to:
receive, from a satellite vehicle (SV), a signal of a first frequency band;
estimate a first ionospheric delay residual error based on the signal of the first frequency band;
calculate a first pseudorange measurement and a first carrier phase measurement based on the first ionospheric delay residual error; and
estimate a position using the first pseudorange measurement and the first carrier phase measurement.

12. The UE of claim 11, wherein the one or more processors, when calculating the first pseudorange measurement or the first carrier phase measurement, are configured to calculate the first pseudorange measurement or the first carrier phase measurement based on the first ionospheric delay residual error and at least one of: a geometry range, a receiver clock timing, an inter-system time bias, a tropospheric delay residual error, an ambiguity term, a noise or multipath delay, or combinations thereof.

13. The UE of claim 12, wherein the one or more processors, when calculating the first pseudorange measurement, are configured to calculate the first pseudorange measurement according to equation $$P_{f1} = \rho + dT + dTrop + \frac{dIono}{f_1^2} + \epsilon_{P_{f1}},$$

wherein:
$P_{f1}$ comprises a pseudorange measurement based on a first frequency f1;
$\rho$ comprises a geometry range;
dT comprises a receiver clock error determined by $P_{f1}$;
dTrop comprises a troposphere delay residual error;
dIono comprises an ionosphere delay residual error; and
$\epsilon_p$ comprises a noise and multipath error.

14. The UE of claim 13, wherein the one or more processors, when calculating the first carrier phase measurement, are configured to calculate the first carrier phase measurement according to equation $$\Phi_{f1} = \rho + dT + dTrop - \frac{dIono}{f_1^2} + \lambda_{f1}(N_{f1} + r_{f1} - s_{f1}) + \epsilon_{\Phi_{f1}},$$

wherein:
$\Phi_{f1}$ comprises a carrier phase measurement based on the first frequency f1;
$\rho$ comprises a geometry range;
dT comprises a receiver clock error determined by $P_{f1}$;
dTrop comprises a troposphere delay residual error;
dIono comprises an ionosphere delay residual error;
$\lambda$ comprises a wavelength of the signal;
N comprises an integer ambiguity term;
r comprises an ambiguity receiver fractional bias term;
s comprises an ambiguity satellite fractional bias term; and
$\epsilon_\Phi$ comprises a noise and multipath error.

15. The UE of claim 11, wherein the one or more processors, when estimating an ionospheric delay residual error based on the signal of the first frequency band, are configured to estimate the ionospheric delay residual error based on a Klobuchar equation.

16. The UE of claim 11, wherein the first frequency band comprises an L1 band, an L2 band, an L5 band, an E1 band, or an E5 band.

17. The UE of claim 11, wherein the one or more processors, when estimating a position using the first pseudorange measurement and the first carrier phase measurement, are configured to perform ultra-long baseline real-time kinematics (RTK) positioning.

18. The UE of claim 11, wherein the one or more processors are further configured to:
receive, from the SV, a signal of a second frequency band;
estimate a second ionospheric delay residual error based on the signal of the second frequency band; and
calculate a second pseudorange measurement and a second carrier phase measurement based on the second ionospheric delay residual error;

wherein estimating the position using the first pseudorange measurement and the first carrier phase measurement comprises estimating the position using the first pseudorange measurement, the first carrier phase measurement, the second pseudorange measurement, and the second carrier phase measurement.

19. The UE of claim 18, wherein the one or more processors, when calculating the second pseudorange measurement are configured to calculate second first pseudorange measurement according to equation $$P_{f2} = \rho + dT + ISTB_{f2} + dTrop + \frac{dIono}{f_2^2} + \epsilon_{P_{f2}},$$

wherein:
$P_{f2}$ comprises a pseudorange measurement based on a second frequency f2;
$\rho$ comprises a geometry range;
dT comprises a receiver clock error determined by $P_{f1}$;
$ISTB_{f2}$ comprises an inter-system time bias;
dTrop comprises a troposphere delay residual error;
dIono comprises an ionosphere delay residual error; and
$\epsilon_p$ comprises a noise and multipath error.

20. The UE of claim 19, wherein the one or more processors, when calculating the second carrier phase measurement are configured to calculate the second carrier phase measurement according to equation $$\Phi_{f2} = \rho + dT + ISTB_{f2} + dTrop - \frac{dIono}{f_2^2} + \lambda_{f2}(N_{f2} + r_{f2} - s_{f2}) + \epsilon_{\Phi_{f2}},$$

wherein:
$\Phi_{f2}$ comprises a carrier phase measurement based on the second frequency f2;
$\rho$ comprises a geometry range;
dT comprises a receiver clock error determined by $P_{f1}$;
$ISTB_{f2}$ comprises an inter-system time bias;
dTrop comprises a troposphere delay residual error;
dIono comprises an ionosphere delay residual error;
$\lambda$ comprises a wavelength of the signal;
N comprises an integer ambiguity term;
r comprises an ambiguity receiver fractional bias term;
s comprises an ambiguity satellite fractional bias term; and
$\epsilon_\Phi$ comprises a noise and multipath error.

21. A user equipment (UE), comprising:
means for receiving, from a satellite vehicle (SV), a signal of a first frequency band;
means for estimating a first ionospheric delay residual error based on the signal of the first frequency band;
means for calculating a first pseudorange measurement and a first carrier phase measurement based on the first ionospheric delay residual error; and
means for estimating a position using the first pseudorange measurement and the first carrier phase measurement.

22. The UE of claim 21, wherein calculating the first pseudorange measurement or the first carrier phase measurement based on the first ionospheric delay residual error comprises calculating the first pseudorange measurement or the first carrier phase measurement based on the first ionospheric delay residual error and at least one of: a geometry range, a receiver clock timing, an inter-system time bias, a tropospheric delay residual error, an ambiguity term, a noise or multipath delay, or combinations thereof.

23. The UE of claim 22, wherein calculating the first pseudorange measurement comprises calculating the first pseudorange measurement according to equation $$P_{f1} = \rho + dT + dTrop + \frac{dIono}{f_1^2} + \epsilon_{P_{f1}},$$

wherein:
P$_{f1}$ comprises a pseudorange measurement based on a first frequency f1;
$\rho$ comprises a geometry range;
dT comprises a receiver clock error determined by P$_{f1}$;
dTrop comprises a troposphere delay residual error;
dIono comprises an ionosphere delay residual error; and
$\epsilon_p$ comprises a noise and multipath error.

24. The UE of claim 23, wherein calculating the first carrier phase measurement comprises calculating the first carrier phase measurement according to equation $$\Phi_{f1} = \rho + dT + dTrop - \frac{dIono}{f_1^2} + \lambda_{f1}(N_{f1} + r_{f1} - s_{f1}) + \epsilon_{\Phi_{f1}},$$

wherein:
$\Phi_{f1}$ comprises a carrier phase measurement based on the first frequency f1;
$\rho$ comprises a geometry range;
dT comprises a receiver clock error determined by P$_{f1}$;
dTrop comprises a troposphere delay residual error;
dIono comprises an ionosphere delay residual error;
$\lambda$ comprises a wavelength of the signal;
N comprises an integer ambiguity term;
r comprises an ambiguity receiver fractional bias term;
s comprises an ambiguity satellite fractional bias term; and
$\epsilon_\Phi$ comprises a noise and multipath error.

25. The UE of claim 21, wherein estimating a first ionospheric delay residual error based on the signal of the first frequency band comprises estimating the first ionospheric delay residual error based on a Klobuchar equation.

26. The UE of claim 21, wherein the first frequency band comprises an L1 band, an L2 band, an L5 band, an E1 band, or an E5 band.

27. The UE of claim 21, wherein estimating a position using the first pseudorange measurement and the first carrier phase measurement comprises performing ultra-long baseline real-time kinematics (RTK) positioning.

28. The UE of claim 21, further comprising:
means for receiving, from the SV, a signal of a second frequency band;
means for estimating a second ionospheric delay residual error based on the signal of the second frequency band; and
means for calculating a second pseudorange measurement and a second carrier phase measurement based on the second ionospheric delay residual error;

wherein estimating the position using the first pseudorange measurement and the first carrier phase measurement comprises estimating the position using the first pseudorange measurement, the first carrier phase measurement, the second pseudorange measurement, and the second carrier phase measurement.

29. The method UE of claim 28, wherein calculating the second pseudorange measurement comprises calculating second first pseudorange measurement according to equation $$P_{f2} = \rho + dT + ISTB_{f2} + dTrop + \frac{dIono}{f_2^2} + \epsilon_{P_{f2}},$$

wherein:
P$_{f2}$ comprises a pseudorange measurement based on a second frequency f2;
$\rho$ comprises a geometry range;
dT comprises a receiver clock error determined by P$_{f1}$;
ISTB$_{f2}$ comprises an inter-system time bias;
dTrop comprises a troposphere delay residual error;
dIono comprises an ionosphere delay residual error; and
$\epsilon_p$ comprises a noise and multipath error.

30. The method UE of claim 29, wherein calculating the second carrier phase measurement comprises calculating the second carrier phase measurement according to equation $$\Phi_{f2} = \rho + dT + ISTB_{f2} + dTrop - \frac{dIono}{f_2^2} + \lambda_{f2}(N_{f2} + r_{f2} - s_{f2}) + \epsilon_{\Phi_{f2}},$$

wherein:
$\Phi_{f2}$ comprises a carrier phase measurement based on the second frequency f2;
$\rho$ comprises a geometry range;
dT comprises a receiver clock error determined by P$_{f1}$;
ISTB$_{f2}$ comprises an inter-system time bias;
dTrop comprises a troposphere delay residual error;
dIono comprises an ionosphere delay residual error;
$\lambda$ comprises a wavelength of the signal;
N comprises an integer ambiguity term;
r comprises an ambiguity receiver fractional bias term;
s comprises an ambiguity satellite fractional bias term; and
$\epsilon_\Phi$ comprises a noise and multipath error.

31. A non-transitory computer-readable medium storing a set of instructions, the set of instructions comprising one or more instructions that, when executed by one or more processors of a user equipment (UE), cause the UE to:
receive, from a satellite vehicle (SV), a signal of a first frequency band;
estimate an ionospheric delay residual error based on the signal of the first frequency band;
calculate a pseudorange measurement and a carrier phase measurement based on the ionospheric delay residual error; and
estimate a position using the pseudorange measurement and the carrier phase measurement.

* * * * *